United States Patent [19]

Takasu et al.

[11] Patent Number: 4,480,615

[45] Date of Patent: Nov. 6, 1984

[54] METHOD AND APPARATUS FOR CONTROLLING IGNITION TIMING IN A MULTICYLINDER INTERNAL COMBUSTION ENGINE

[75] Inventors: Yasuhito Takasu, Toyohashi; Shingo Inoue, Anjo; Toshiharu Iwata, Aichi, all of Japan

[73] Assignee: Nippondenso Co., Ltd., Kariya, Japan

[21] Appl. No.: 459,497

[22] Filed: Jan. 20, 1983

Related U.S. Application Data

[63] Continuation-in-part of Ser. No. 403,816, Jul. 30, 1982, Pat. No. 4,432,322.

[30] Foreign Application Priority Data

Jan. 21, 1982 [JP] Japan .................................. 57-8528

[51] Int. Cl.³ .............................................. F02P 5/04
[52] U.S. Cl. ..................................... 123/416; 123/425; 123/417; 123/415
[58] Field of Search ................ 123/425, 415, 416, 417, 123/419; 73/3 J

[56] References Cited

U.S. PATENT DOCUMENTS

| | | | |
|---|---|---|---|
| 4,131,097 | 12/1978 | Sawada et al. | 123/415 |
| 4,153,019 | 5/1979 | Laubenstein et al. | 123/425 |
| 4,166,440 | 9/1979 | Helava et al. | 123/416 |
| 4,243,007 | 1/1981 | Ehrhardt et al. | 123/416 |
| 4,331,117 | 5/1982 | Ginsburgh | 123/417 |
| 4,378,004 | 3/1983 | Petrie | 123/416 |
| 4,403,584 | 9/1983 | Suzuki et al. | 123/417 |

Primary Examiner—Raymond A. Nelli
Attorney, Agent, or Firm—Cushman, Darby & Cushman

[57] ABSTRACT

Engine operating parameters are detected to set a basic ignition timing, and this basic ignition timing is forcibly changed to effect feedback control in which an engine output parameter is detected for finding an optimum combination of ignition timings of the individual cylinders. The ignition timing for all the cylinders is uniformly changed for a predetermined period of time so that engine output increases, and then ignition timing is individually controlled for each of the cylinders so that ignition timing of each cylinder is optimum. The engine is operated with a plurality of different ignition timing combinations, where the number of the combinations equals the number of the cylinders plus one. The average value of various ignition timings of the plurality of combinations is calculated, and the combination giving the lowest engine output parameter is detected. A new ignition timing combination is set so that engine output increases, and the combination giving the lowest engine output parameter is replaced by the new combination so that a new set of the plurality of ignition timing combinations is provided. In this way the ignition timing combination is renewed successively for finding the optimum ignition timing combination.

10 Claims, 11 Drawing Figures

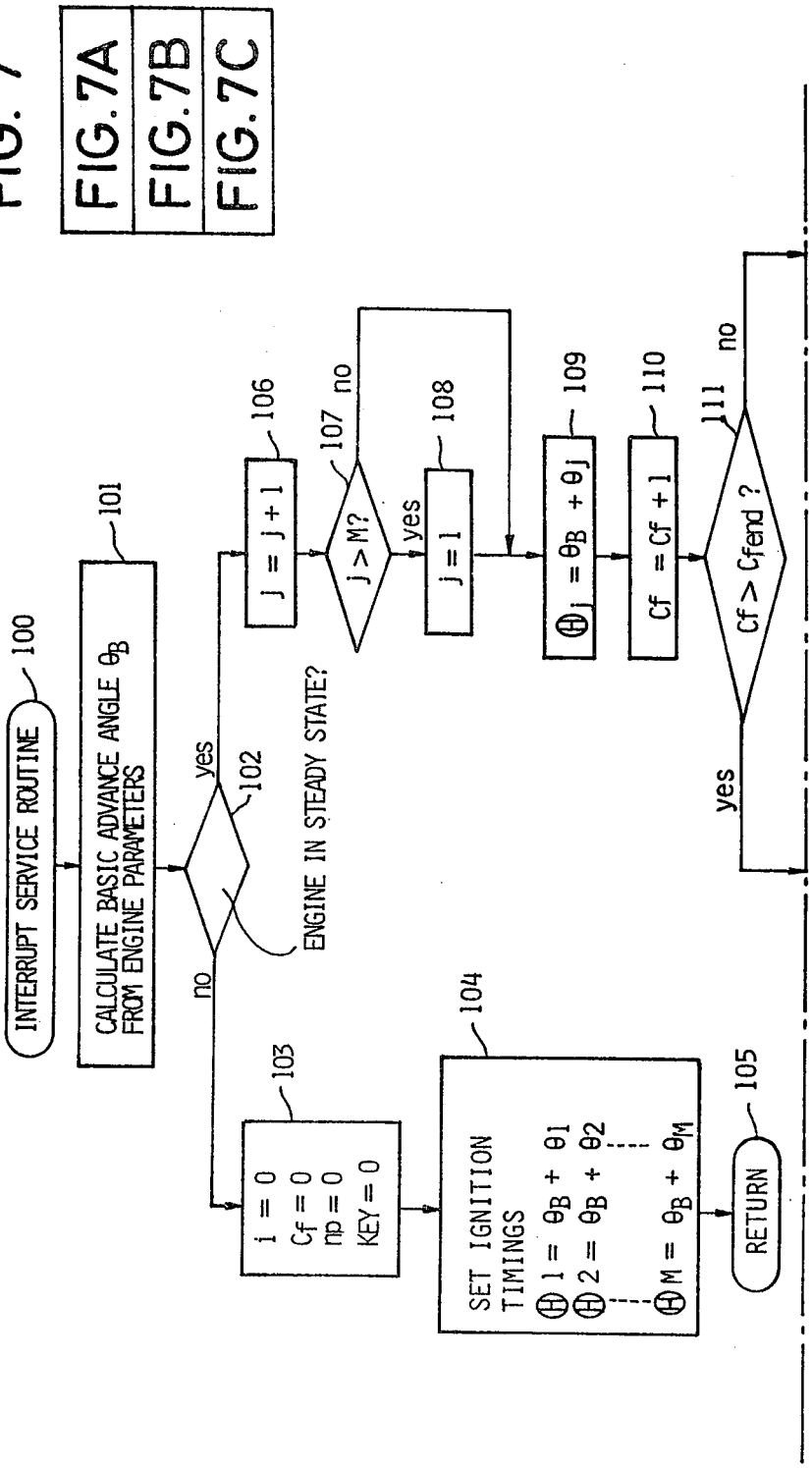

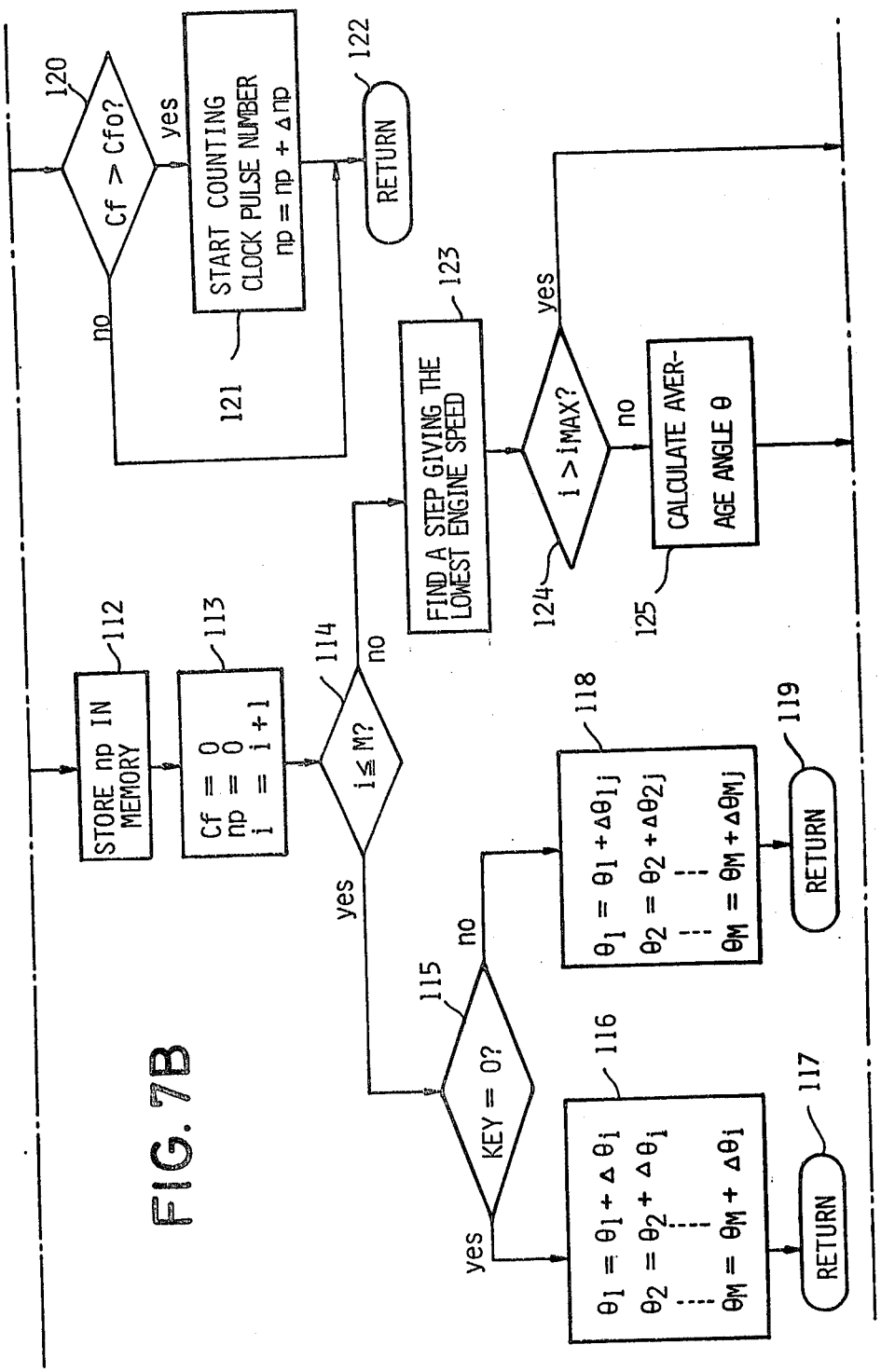

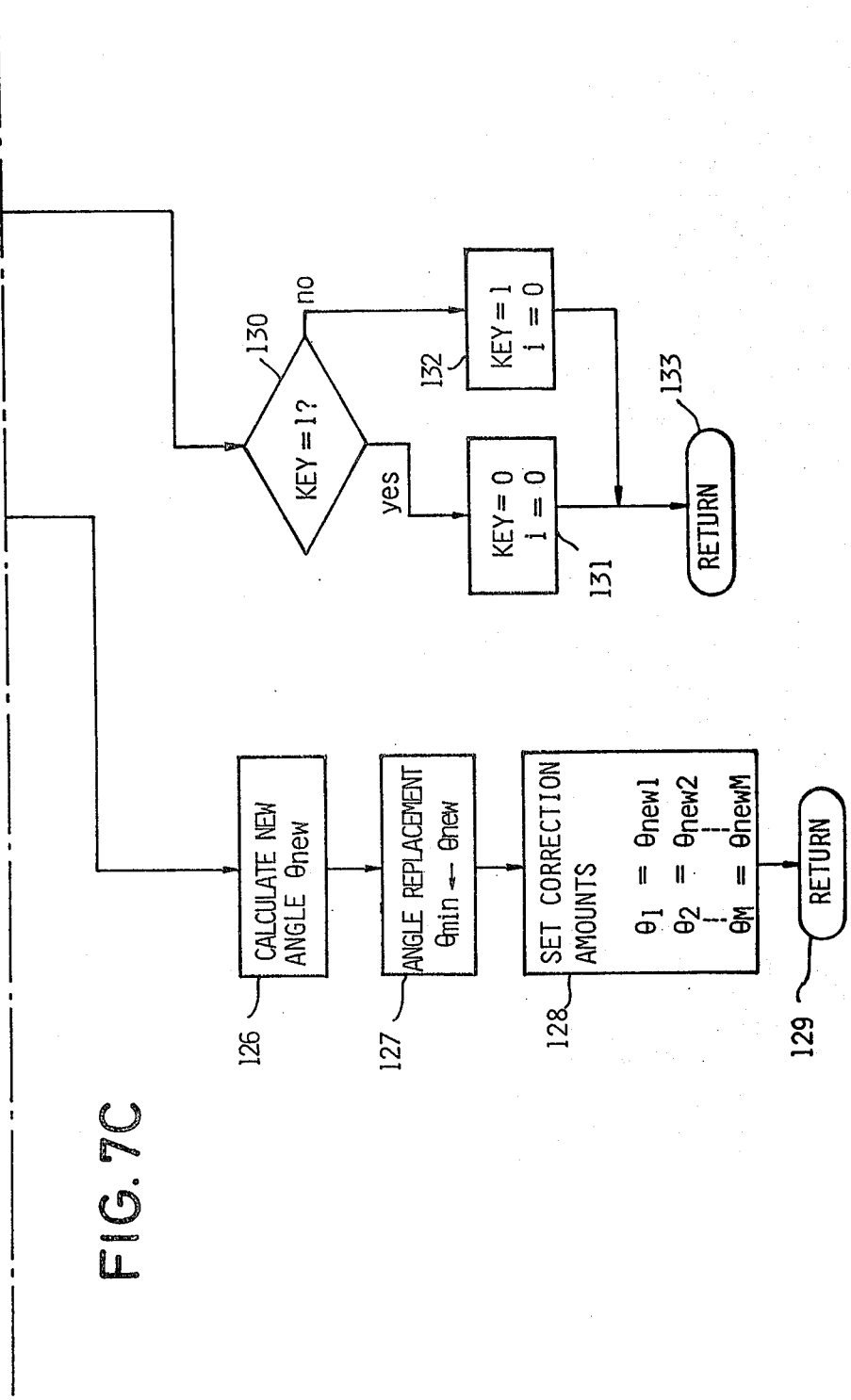

METHOD AND APPARATUS FOR CONTROLLING IGNITION TIMING IN A MULTICYLINDER INTERNAL COMBUSTION ENGINE

BACKGROUND OF THE INVENTION

This application is a continuation-in-part of Inoue et al Co-pending U.S. application Ser. No. 403,816 now U.S. Pat. No. 4,432,322 filed on July 30, 1982 assigned to Nippondenso Co., Ltd.

This invention relates generally to ignition timing control in a multicylinder internal combustion engine, and more particularly the present invention relates to method and apparatus for controlling ignition timing for each cylinder so that ignition timing in each cylinder is optimum to obtain the highest engine output.

In an internal combustion engine, the ignition timing is generally determined so that engine output is maximum and fuel consumption is minimum from engine parameters such as engine rotational speed and intake pressure or intake airflow. However, an ignition timing determined in this way is not necessarily ideal throughout all the cylinders in a multicylinder engine because of variations or differences among individual cylinders, existing from the time of manufacturing and during aging or use. Therefore, when a given ignition timing is set to all the cylinders commonly, the resultant engine output sometimes cannot be high enough which is expected when ideal or optimum ignition timing is resespectively set to individual cylinders.

SUMMARY OF THE INVENTION

The present invention has been developed in order to remove the above-described drawbacks inherent to the conventional method and apparatus for controlling ignition timing in a multicylinder internal combustion engine.

It is, therefore, an object of the present invention to provide a method and apparatus with which ignition timing of each cylinder is selected so that resultant engine output is maximized.

According to a feature of the present invention the ignition timing for all the cylinders is uniformly changed for a predetermined period of time so that engine output increases, and then ignition timing is individually controlled for each of the cylinders so that ignition timing of each cylinder is optimized. In order to find a combination of optimum ignition timings of all the cylinders, ignition timing or its correction amount for each cylinder is forcibly changed to effect feedback control in which engine output is detected. The engine is operated with a plurality of different ignition timing combinations, where the number of the combinations equals the number of the cylinders plus one. The average value of various ignition timings in the plurality of combinations is calculated, and one of the combinations giving the lowest engine output is detected. A new ignition timing combination is set so that engine output increases, and the combination giving the lowest engine output is replaced by the new combination so that a new set of the plurality of ignition timing combinations is provided. In this way the ignition timing combination is renewed successively for finding an optimum ignition timing combination.

BRIEF DESCRIPTION OF THE DRAWINGS

The object and features of the present invention will become more readily apparent from the following detailed description of the preferred embodiments taken in conjunction with the accompanying drawings in which:

FIGS. 7 and 7a–7c are a flow chart showing the operational steps executed by the computer included in the ignition timing control circuit of FIG. 5.

The same or corresponding elements and parts are designated at like reference numerals throughout the drawings.

DETAILED DESCRIPTION OF THE INVENTION

Prior to describing the preferred embodiment of the present invention, the principle or concept of the invention, namely, the way of finding an optimum combination of ignition timings of individual cylinders will be described with reference to FIGS. 1, 2 and 3.

Figure 1:
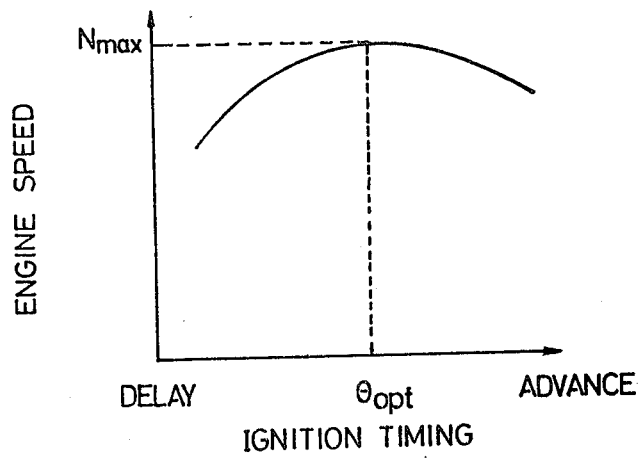
FIG. 1 is a graph showing the relationship between ignition timing and engine rotational speed.

FIG. 1 shows the general relationship between the ignition timing expressed in terms of advance angle, and engine rotational speed in a single cylinder engine. As will be understood from FIG. 1, the curve has a peak point showing the maximum engine speed Nmax. An ignition timing providing the maximum engine speed Nmax is referred to as an optimum ignition timing or peak point $\theta$opt. In other words, the ignition timing should be set to the optimum value $\theta$opt to obtain the highest engine speed Nmax. However, in a multicylinder engine, the relationship between the ignition timing and engine speed is not simple as shown in FIG. 1 because the optimum ignition timing $\theta$opt is not necessarily common to all the cylinders.

Figure 2:
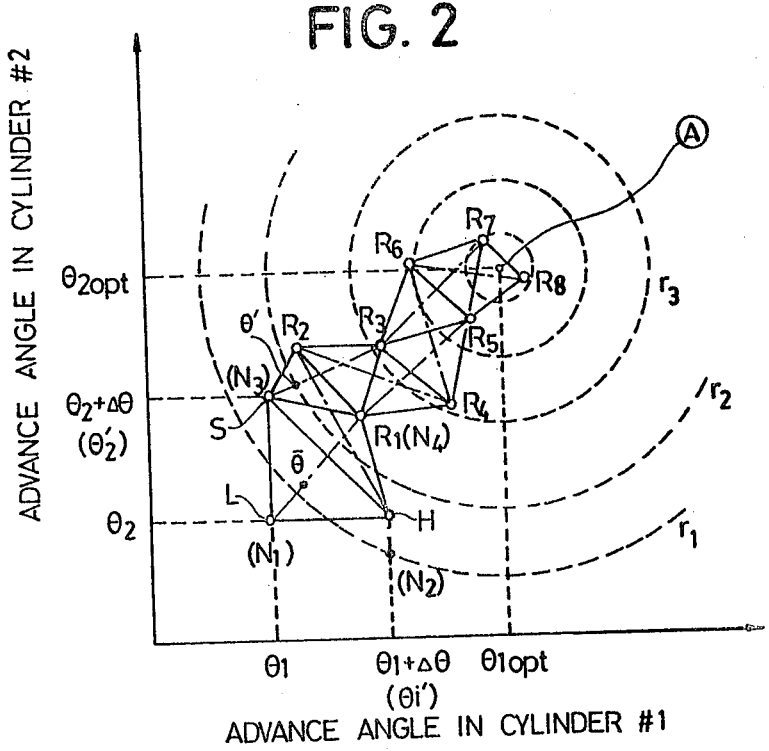
FIG. 2 is an explanatory diagram in the form of an engine speed contour map, showing the fundamental method of finding an optimum combination of two ignition timings for a two-cylinder engine.

This point will be described with reference to FIG. 2 showing an engine speed contour map. Taking an example of a two-cylinder engine for simplicity, it is assumed that the two-cylinder engine exhibits the maximum output or engine speed when each ignition timing at each cylinder is set to its optimum value $\theta_{1opt}$ and $\theta_{2opt}$. The references #1 and #2 respectively indicate the first and second cylinders, and the advance angle of the first cylinder #1 is plotted along the x-distance, while the advance angle of the second cylinder #2 is plotted along the y-distance. A point "A" at the center of the contour map indicates a combination of the optimum ignition timings $\theta_{1opt}$ and $\theta_{2opt}$, and another point $\theta_B$ corresponding to the origin of the co-ordinates indicates a combination of initial ignition timings in which the ignition timings of the first and second cylinders #1 and #2 are equal to each other. Dotted coaxial circular lines r1, r2, r3 . . . indicate contours of engine speed which vary as the ignition timing of one or both of the first and second cylinders #1 and #2 changes. The point "A" which may be referred to as an optimum timing combination point, is a point where the engine speed is maximized as described above, and this means maximum torque can be obtained when the engine operates under such a condition.

Now, the way or technique of finding this optimum timing combination point "A" will be described. In FIG. 2, it is assumed that the ignition timing of the first cylinder #1 is expressed by $\theta_1$ and the ignition timing of the second cylinder #2 by $\theta_2$. A point "L" indicates the combination of the ignition timings $\theta_1$ and $\theta_2$, and it is also assumed that the engine operates at a speed N1 with such an ignition timing combination for a given period of time, such as a period corresponding to a given number of rotations such as 20 revolutions. The advance angles plotted along the x and y distances are correction amounts or angles which are added to the basic ignition timing $\theta_B$. Namely, as described above, the origin of the co-ordinate does not equal zero but equals the basic ignition timing $\theta_B$, and the amounts or angles along the x and y distances are correction amounts to be added to the basic ignition timing $\theta_B$.

After the engine has been operated under the condition of the ignition timing combination of the point L, the ignition timing of the first and/or the second cylinder #1 and #2 is changed so that the engine operates at a speed N2. For instance, the ignition timing $\theta_1$ of the first cylinder #1 is changed to $\theta_1+\Delta\theta$, while the ignition timing $\theta_2$ of the second cylinder #2 is maintained at $\theta_2$. The new combination $(\theta_1+\Delta\theta, \theta_2)$ is at a point H. After the engine has been operated under this condition, i.e. with the ignition timining combination H, for a given period of time, the ignition timing is further changed to a point S where the ignition timing of the first cylinder #1 is returned to $\theta_1$, and the ignition timing of the second cylinder #2 is changed to $\theta_2+\Delta\theta$. The engine is operated at this point S $(\theta_1, \theta_2+\Delta\theta)$ for a given period of time, and the engine speed obtained when the engine is in this condition is expressed in terms of N3.

The above-described ignition timing changing will be understood from the following TABLE I.

TABLE I

| CYLINDER | IGNITION TIMING | | | AVERAGE($\bar{\theta}$) |
|---|---|---|---|---|
| #1 | $\theta_1$ | $\theta_1+\Delta\theta$ | $\theta_1$ | $\theta_1+\Delta\theta/3$ |
| #2 | $\theta_2$ | $\theta_2$ | $\theta_2+\Delta\theta$ | $\theta_2+\Delta\theta/3$ |
| ENGINE SPEED | N1 | N2 | N3 | |
| POINT ON FIG. 2 | L | H | S | |

Since the way of finding the optimum ignition timing combination shown in FIG. 2 is directed to an engine having two cylinders, the number of necessary combinations of ignition timings is three. In other words, the number of combinations is required to be greater than the number of cylinders by one.

The above-mentioned three different combinations of ignition timings will be used to find the aforementioned optimum combination "A" in the following manner. First of all, the three ignition timings of each of the cylinders, varying throughout the three combinations are calculated to find average ignition timings for the first and second cylinders #1 and #2. Meanwhile, it is detected at which point the engine speed is the lowest among these three points L, H and S. In other words, it is checked which combination provides the lowest engine speed. In the illustrated example, the engine speed N1 at the point L is the lowest.

Then a point $\bar{\theta}$ indicating the combination of the above-mentioned first and second average ignition timings $\theta_1+\Delta\theta/3$ and $\theta_2+\Delta\theta/3$ is marked, and a line passing through the points $\bar{\theta}$ and L is drawn (see the dot-dash line between points $\bar{\theta}$ and L). This dot-dash straight line is extended in a direction from the point L to the other point 0 beyond the point $\bar{\theta}$, and a new point R1 is set on this dot dash line at a point opposite to the point L with respect to the point $\bar{\theta}$. Namely, this new point R1 is set so that it is closer to the optimum combination point "A" than the point L. The first and second ignition timings defined by this new point or combination R1 are respectively calculated, and the engine is operated with this new combination R1 of the first and second ignition timings. The engine speed with this new ignition timing combination R1 is put as N4, where N4>N1. This new combination R1 is then used in place of the first mentioned combination L. Thus, comparison between three combinations H, S and R1 is effected with respect to their engine speeds N2, N3 and N4. In other words, the combination L is replaced with the new combination R1. Among the three engine speeds N2, N3 and N4 is detected the lowest speed. In this example, N3 is the lowest, and therefore the point S is determined as the lowest engine speed point. An average ignition timing of the three points H, S and R1 is calculated for each cylinder. The combination of the average ignition timings is shown by a point $\theta'$, and a line passing through the point $\theta'$ and the lowest engine speed point S is drawn (see the dot-dash line passing these points). This dot-dash line is extended in a direction from the point S to the point $\theta'$ and beyond the point $\theta'$ so that a further new point R2 is set on this line at a point opposite to the point S with respect to the point $\theta'$. Namely, this new point R2 is set so that the engine speed obtained thereby is higher than that of the point S.

The above-mentioned operations are repeated to find a new combination successively. In other words, the combination of the ignition timings is changed or correct as R1→R2→R3→R4→R5→R6→R7→R8 in a direction of the engine speed increase. Since the engine speed obtained by a new combination of ignition timings is usually higher than the engine speed by the old combination, repetition of the above steps results in convergence of the engine speed toward the optimum combination or point "A". In this way the optimum ignition timing combination "A" can be found.

Figure 3:
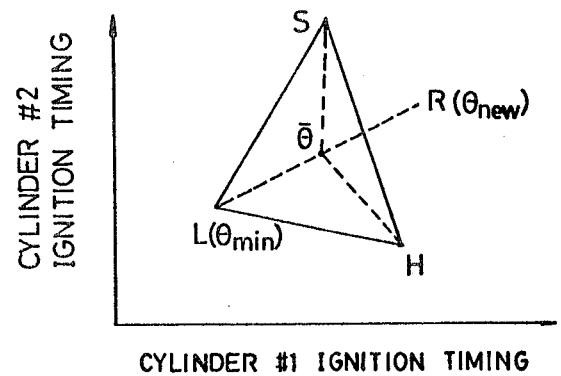
FIG. 3 is an explanatory diagram showing the way of determining a new combination of ignition timings for increasing the engine speed from a plurality of ignition timings whose number is larger than the number of cylinders by one.

FIG. 3 illustrates the way of finding a new combination point from the original three points H, S and L. The new point is denoted by $\theta_{new}$, which corresponds to the point R1 in FIG. 2. The average ignition timing 0 is given by the following vector expression:

$$\bar{\theta} = \frac{H+S+L}{3} \qquad (1)$$

Assuming that the new combination point substituting for the old combination point $0_{min}$ (point L), where the engine speed is the lowest, is expressed by $\theta_{new}$, this new combination is given by:

$$\theta_{new} = \bar{\theta} - \alpha(\theta_{min} - \bar{\theta}) \quad (2)$$

wherein $\alpha$ is a constant.

Although the above-described principle of the way of finding the optimum ignition timing combination "A" is usable, when this method is simply applied, there is a fear that it would take a relatively long time to find the optimum point "A" because of the following reasons.

When the way of finding the point "A" illustrated in FIG. 2 is applied, the ignition timing may possibly be changed in the wrong direction so that the engine speed is actually decreased when the difference between engine speeds is respectively obtained by a plurality of ignition timing combinations. Furthermore, when the amount of change in ignition timing is different throughout all the cylinders, the engine operating time is relatively long until the convergence to the optimum timing in each cylinder.

In order to obviate the problem of taking a long time for the convergence, therefore, the amount of change in ignition timing is set to a given value throughout all the cylinders from the beginning of the ignition timing control for a predetermined period of time, and then the amount of change is individually set to each cylinder.

Namely, the amount of ignition timing change is uniformly set to all the cylinders at the beginning of the control, and then this control mode is changed to individual control in which the amount of ignition timing has variation throughout the cylinders so that the optimum ignition timing for each cylinder can be finally found with less time. The following TABLE II shows the above-mentioned uniform timing change control mode.

TABLE II

Figure 8:
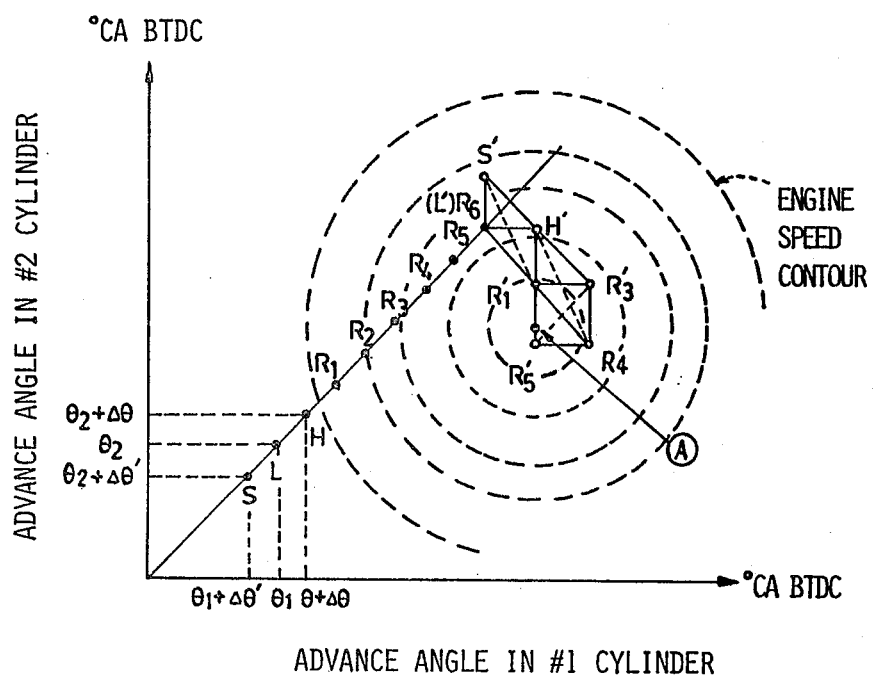
FIG. 8 is an explanatory diagram in the form of a contour map, showing the way of finding the optimum combination of ignition timings according to the present invention.

| CYLINDER | IGNITION TIMING | | | AVERAGE ($\bar{\theta}$) |
|---|---|---|---|---|
| #1 | $\theta_1$ | $\theta_1 + \Delta\theta$ | $\theta_1 + \Delta\theta'$ | $\theta_1 + (\Delta\theta + \Delta\theta')/3$ |
| #2 | $\theta_2$ | $\theta_2 + \Delta\theta$ | $\theta_2 + \Delta\theta'$ | $\theta_2 + (\Delta\theta + \Delta\theta')/3$ |
| ENGINE SPEED | N1 | N2 | N3 | |
| POINT ON FIG. 8 | L | H | S | |

From the comparison between TABLE I and TABLE II it will be understood that the ignition timing in each cylinder is changed by the same amount so that uniform control mode is established. This uniform control mode will be further described with reference to FIG. 8 later.

Although the above description is directed to a two-cylinder engine for simplicity, the ignition timing control in a larger number cylinder engine can be effected with the same principle as the above for controlling ignition timings of respective cylinders and maximizing engine speed.

Figure 4:
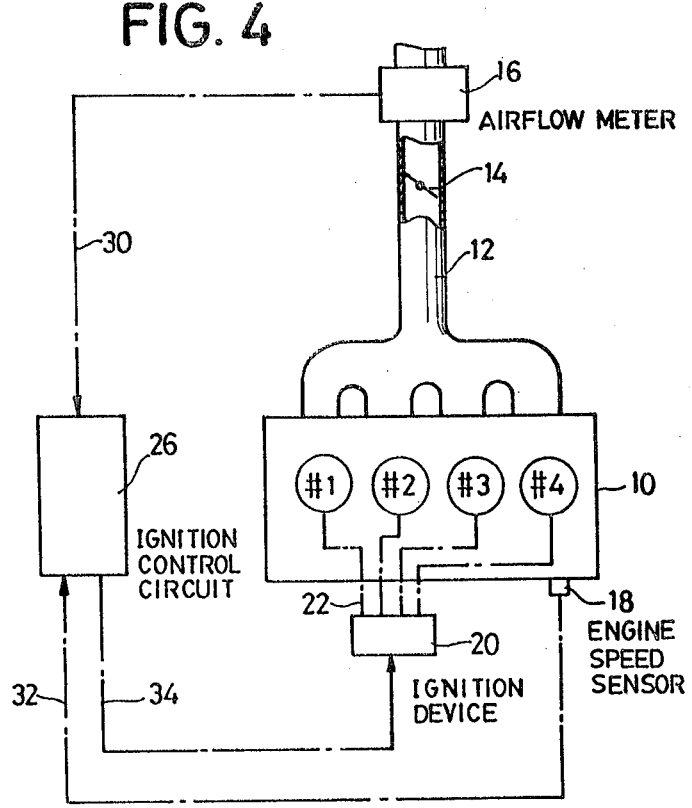
FIG. 4 is a schematic diagram showing the apparatus for controlling ignition timing according to the present invention.

Reference is now made to FIG. 4 which shows apparatus for controlling ignition timing according to the present invention. In FIG. 4, the reference 10 is an internal combustion engine body having four cylinders #1, #2, #3, and #4. Intake air is led to the respective cylinders via an intake manifold 12, where a throttle valve 14 controls the intake airflow. An airflow meter 16 is provided upstream the throttle valve 14 for measuring the intake airflow. This airflow meter 16, however, may be replaced by an intake pressure sensor. The reference 18 is a rotational speed sensor which produces a signal indicative of the revolution of the engine crankshaft. For the rotational speed sensor 18 there may be used a well known crankshaft angle sensor which is arranged to produce a pulse singal when the engine crankshaft assumes a given rotational angle.

The reference 20 is an ignition device comprising an ignitor, a distributor, and an ignition coil, which are not shown. The ignition device 20 is connected via conductors 22 (see dot-dash lines) to spark plugs of respective cylinders.

An ignition control circuit 26 is provided to produce actuation signals to be applied to the ignition device 20. The ignition control circuit 26 comprises a computer programmed to execute steps which will be described later. The above-mentioned intake airflow meter 16 and rotational speed sensor 18 are arranged to supply the ignition control device 26 with their output signals via conductors 30 and 32. Thus, the ignition control circuit 26 calculates an ignition timing which is determined by the intake airflow and the engine rotational speed represented by the output signals from the airflow meter 16 and the rotational speed sensor 18. The result of this calculation is fed via a conductor 34 to the ignition device 20 so that ignition timing will be controlled.

Figure 5:
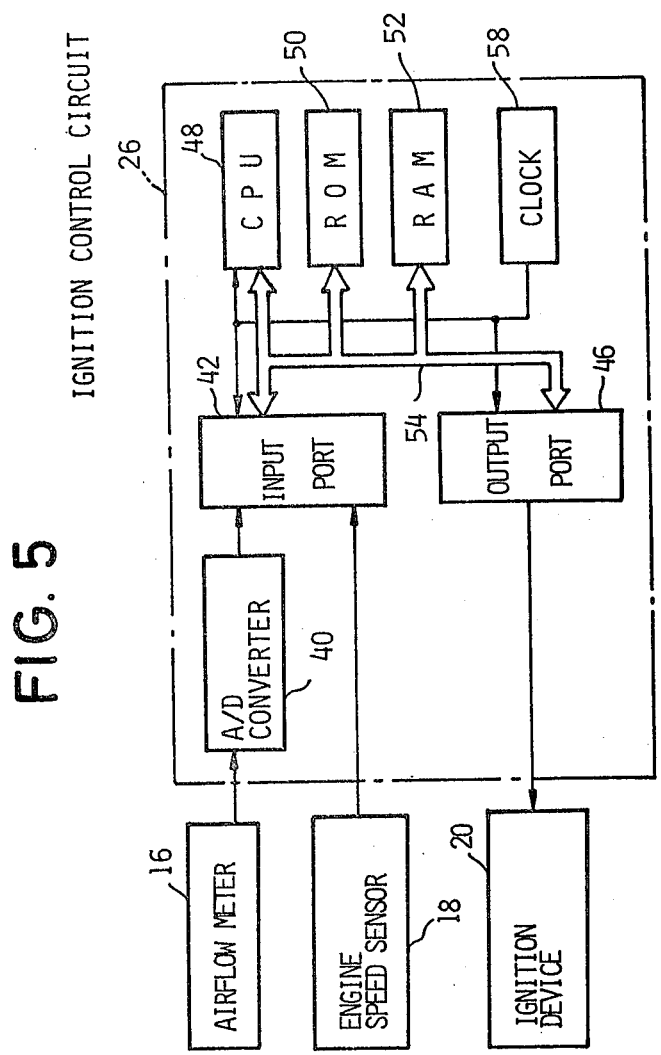
FIG. 5 is a schematic diagram of the ignition control circuit shown in FIG. 4.

FIG. 5 illustrates a block diagram of the ignition control circuit 26 having an A/D converter 40, an input port 42, an output port 46, a CPU 48, a ROM 50, a RAM 52, and a clock generator 58. The input port 42 is used to receive the output signals from the airflow meter 16 and the rotational speed sensor 18. The A/D converter 40 converts an analog signal from the airflow meter 16 or an intake pressure sensor to a digital signal so that the converted digital signal is fed to the input port 42. The output port 46 functions as a signal gate so that the timing of the actuation signal fed to the ignition device 20 will be controlled thereby. The input and output ports 42 and 46 are both connected via a bus 54 to the CPU 48, ROM 50, RAM 52 constituting a computer. Signal transmission between these circuits is effected in synchronism with clock pulses from the clock generator 58.

The ignition control circuit 26 is so programmed that an optimum ignition timing will be obtained for each of the cylinders as described in the above. Although the engine 10 illustrated in FIG. 4 has four cylinders, the operation of the ignition control circuit 26 will be described with reference to FIG. 6, by way of an example of a two-cylinder engine for simplicity.

Figure 6:
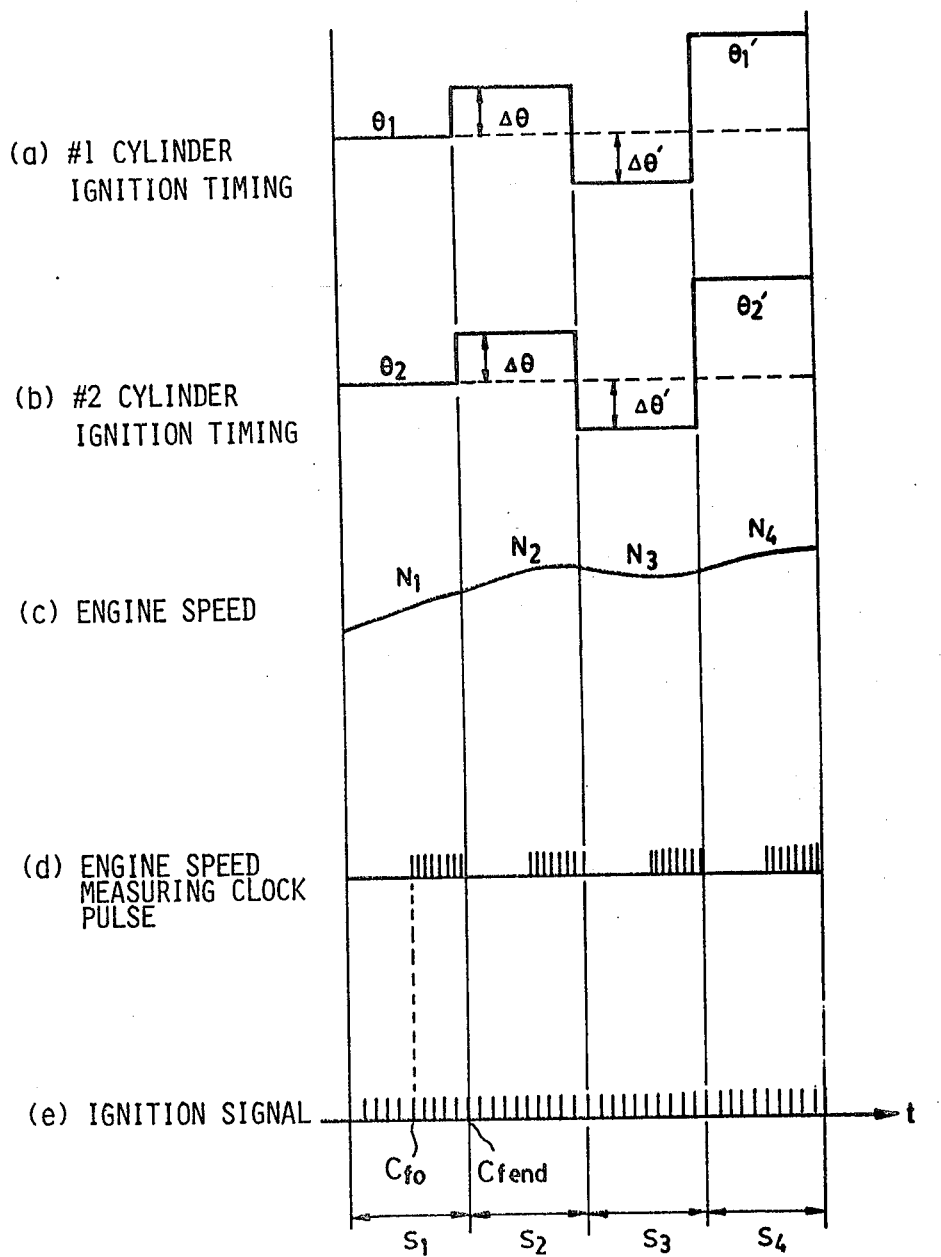
FIG. 6 is a timing chart of an operating process showing how to obtain an optimum combination of ignition timings according to the present invention.

At the beginning of the calculation, namely in a first step S1, the ignition timings of the cylinders are set to $\theta_1$ and $\theta_2$ respectively as shown by (a) and (b) in FIG. 6. Engine operation under these conditions causes a change in the engine rotational speed as shown by (c), while ignition pulses are produced and fed to the spark plugs of the cylinders as shown by (e). The clock pulses between predetermined ignition signal Cfo and Cfend around the end of the first step S1 are taken in so that the number thereof is counted as shown by (d). This number of clock pulses between Cfo and Cfend is regarded as the engine speed N1 at the step S1.

In a following second step S2, the ignition timing of the first cylinder #1 is changed to $\theta_1 + \Delta\theta$, while the ignition timing of the second cylinder #2 is changed to $\theta_2 + \Delta\theta$. Under this condition the engine is operated for a predetermined period of time so as to measure the engine speed in the same manner as in the first step S1. Namely, the number of clock pulses between Cfo and Cfend in the second step S2 is regarded as the engine rotational speed N2. In this way, another engine speed N3 will be measured in a following third step S3. When three combinations of ignition timings are obtained, the average value $\bar{\theta}$ throughout the three combinatios is calculated as described with reference to TABLE II and FIG. 3. Simultaneously, one of the three points or combinations, which gives the lowest engine speed, is determined. Then a new combination of ignition timings $\theta_1'$ and $\theta_2'$ is calculated using the way described with reference to FIG. 3. Namely, the new point is found on a line passing through the lowest engine speed point L and the average ignition timing point $\bar{\theta}$, at a distance opposite to the point L with respect to the point $\bar{\theta}$. The engine 10 is then operated with this new ignition timing combination for a predetermined period of time in a fourth step S4. The engine speed at this time is detected as N4 in the same manner as described in the above. After this, the above operations are repeated for a predetermined period of time.

After this predetermined period of time an optimum ignition timing for each cylinder will be found by using ignition timing combinations of TABLE I. A new combination will be found successively in the same manner as in FIG. 6. Summarizing the way of finding the optimum ignition timing combination or point "A" of FIG. 2, the combination of the ignition timing is changed one after another according to TABLE II first, and then the combination is further changed one after another according to TABLE I.

The above-described ignition timing control will be further described in detail with reference to a flow chart of FIG. 7. In the illustrated embodiment, ignition timing control is arranged to be executed by an interrupt service routine. Namely, the computer of FIG. 5 is arranged to execute an unshown main routine normally. An interrupt request is arranged to be produced each time the engine crankshaft assumes a predetermined angle so that the interrupt service routine is repeatedly executed whenever the engine operates. When the engine starts, an interrupt request is applied to the computer so that the operational flow enters into the interrupt service routine of FIG. 7 (see step 100). The interrupt sevice routine comprises various steps as will be described hereinbelow, but these steps in the program should not be confused with the steps S1, S2 ... SM of FIG. 6.

In a following step 101, a basic ignition timing $\theta_B$ is calculated on the basis of the intake airflow data and the engine speed data both fed from the input port 42 of FIG. 5. This calculation is effected such that a most suitable ignition timing is selected from a map stored in the ROM 50 in accordance with the airflow and engine speed data. Nextly, in a step 102, it is detected whether the engine is in steady state or not by detecting the engine speed and the varying rate of the intake vacuum. If the engine is other than the steady state, the answer of the step 102 is NO so that the operational flow proceeds to a step 103. In this step 103, the count i of a step counter, the count Cf of an ignition number counter, the count np of a clock pulse counter, and a flag KEY are all reset to zero or cleared as i=0, Cf=0, np=0, and KEY=0. In a following step 104, the ignition timings of individual cylinders #1, #2, #3 ... #M are set as follows:

$$\textcircled{H}_1 = \theta_B + \Delta\theta_1 \quad (3)$$

-continued $$\textcircled{H}_2 = \theta_B + \Delta\theta_2$$

$$\vdots$$

$$\textcircled{H}_M = \theta_B + \Delta\theta_M$$

wherein $\theta_1, \theta_2 \ldots \theta_M$ are correction amounts of the ignition timing, which amounts are stored in a memory so that one correction amount suitable for the combination of the airflow and engine speed will be selected; and $\theta_B$ is the basic ignition timing or advance angle obtained in the step 101.

After the execution of the step 104, the operational flow returns to the unshown main routine from a step 105.

Turning back to the step 102, when the engine is detected to be in steady state, the answer of the step 102 becomes YES. Then the engine is operated with the combination of ignition timings $\textcircled{H}_1$, $\textcircled{H}_2$ ... $\textcircled{H}_M$ set as described in the above. Thus, the engine speed is measured. Namely, at the beginning the engine speed at the first point L of FIG. 2, i.e. the engine speed N1 in the first step S1 of FIG. 6, is measured. When the answer of the step 102 is YES, a step 106 takes place in which the count J of an ignition counter is added by one in response to a single ignition. This ignition counter is arranged to be cleared or reset to one when the count J reaches the total number M of the cylinders of the engine 10. To this end the count J is detected to see whether it is greater than the total number M of the cylinders in a step 107, and if J is greater than M, J is reset to one in a step 108. On the other hand, if J is not greater than M, the step 108 is skipped so that the operational flow goes to a step 109.

In the step 109, ignition timing is obtained for each cylinder by adding a correction amount $\theta_J$ to the basic advance angle $\theta_B$. Namely, since $\theta_J$ assumes $\theta_1, \theta_2 \ldots \theta_M$ as J changes, ignition timings $\textcircled{H}_J$, i.e. $\textcircled{H}_1$, $\textcircled{H}_2$ ... $\textcircled{H}_M$ will be obtained when the step 109 is executed as many times as the total number M of the cylinders. In a following step 110, the count Cf of the ignition number counter is added by one each time ignition takes place. In a following step 111, it is detected whether the count Cf of the ignition number counter is greater than Cfend shown in FIG. 6. At the very beginning of the engine operation the answer of the step 111 is NO as a matter of course, and thus a step 120 takes place in which it is detected whether Cf is greater than Cfo. If Cf has not yet reached Cfo, the answer of the step 120 assumes NO so that the operational flow returns to the main routine via a step 122. On the other hand, when Cf is greater than Cfo, namely, when entering into the engine speed measuring time between Cfo and Cfend of FIG. 6, a following step 121 is executed in which the count np of the clock pulse counter is added by $\Delta$np. This means that clock pulse counting is started immediately after entering into the engine speed measuring time. After the step 121 the operational flow returns to the main routine via the step 122.

In this way the number of the clock pulses is counted to detect the engine speed. Turning back to the step 111, when the count Cf becomes greater than Cfend, the answer thereof turns to YES, and thus a step 112 takes place. In this step 112, the count np of the clock pulse counter is stored in a memory, i.e. the RAM 52 of FIG. 5. The value of np at this time indicates the engine speed N1 in the step S1 of FIG. 6. In a following step 113, the count Cf and the count np are both reset to zero (Cf=0, np=0), while the count i of the step counter is added by one (i=i+1). This means that the first step S1 of FIG. 6 has been completed and a second step S2 will be executed.

A step 114 follows the step 113 so that it is detected whether the count i is not greater than or equal to M. At this time since i=1, the answer to the step 114 is YES so that the operational flow enters into a step 115 in which it is detected whether the above-mentioned flag KEY has been set to 0 or not. At the beginning since KEY=0, the correction amount $\theta_1, \theta_2 \ldots \theta_M$ for each cylinder is set as follows:

$$\begin{aligned}\theta_1 &= \theta_1 + \Delta\theta_1 \\ \theta_2 &= \theta_2 + \Delta\theta_1 \\ &\vdots \\ \theta_M &= \theta_M + \Delta\theta_1\end{aligned} \quad (4)$$

After the completion of the step 116, the operational flow returns via a step 117 to the main routine. When the operational flow enters into the interrupt service routine through the step 100, the steps 106, 107, 109, 110, 111, 120, 121, 122 are executed in the same manner as the above-mentioned first step S1 so that the engine speed N2 in the second step S2 is measured as the number of the clock pulses to be stored in the memory in the step 112. After this, the step 113 takes place to reset the count Cf of the ignition number counter and the count np of the clock pulse counter, while the count i of the step counter is added by one before entering into the third step S3.

In the step 114, the answer is still YES even in the case of a two-cylinder engine, and the answer of the following step 115 is also YES because KEY=0 as before. Therefore, the ignition timing correction amounts are set in the following step 116 as follows:

$$\begin{aligned}\theta_1 &= \theta_1 + \Delta\theta_2 \\ \theta_2 &= \theta_2 + \Delta\theta_2 \\ &\vdots \\ \theta_M &= \theta_M + \Delta\theta_2\end{aligned} \quad (5)$$

After this, the operational flow returns to the main routine through the step 117, and the interrupt service routine will be executed again from the step 100 so that steps following the step 106 are executed in the same manner as before to measure the engine speed N3 in the third step S3. This engine speed data N3 is stored in the form of the pulse count np in the memory in the step 112.

Passing through the step 113, the operational flow enters into the step 114 in which decision of i≦M is effected. In the case of a two-cylinder engine, the answer of the step 114 becomes NO at this time so that a step 123 takes place. In the step 123, it is detected which step among the steps S1, S2 and S3 gives the lowest engine speed. However, in the case of more than two cylinders the answer of the step 114 repeatedly becomes YES until the value of i exceeds M so that a plurality of ignition timing combinations is obtained, where the number of the combinations equals the total number of the cylinders added by one.

In a following step 124, it is detected whether i is greater than $i_{MAX}$ which is the largest number step, such as three for the third step S3 in a two-cylinder engine case. At the beginning the answer of the step 124 is NO because i equals M. Then a step 125 takes place to calculate the aforementioned average ignition timing $\bar{\theta}$ by using the formula (1).

$$\bar{\theta} = \frac{H + S + L}{3}$$

Since this formula is a vector equation, $\bar{\theta}$ is calculated for each cylinder component of the formulas (3), (4) and (5). Then in a step 126 a new ignition timing combination point is calculated on the basis of the average ignition timing combination point $\bar{\theta}$ obtained in the step 125, by using the aforementioned formula (2):

$$\theta_{new} = \bar{\theta} - \alpha(\theta_{min} - \bar{\theta})$$

The new ignition timing combination point $\theta_{new}$ is such that it results in increase in engine speed. This formula (2) is also a vector equation, and therefore, calculation is effected for each cylinder component of the formulas (3), (4) and (5).

In a step 128 following the step 127, the ignition timing combination $\theta_{min}$ ($\theta_1, \theta_2 \ldots \theta_M$ in formula (3)) giving the lowest engine speed, i.e. N1 in FIG. 2, is replaced with the new ignition timing combination $\theta_{new}$. Then in a following step 128, an ignition timing correction amount is set for each of the cylinders to obtain new $\theta_1, \theta_2 \ldots \theta_M$. After this the operational flow returns to the main routine through a step 129.

Assuming that the operational flow continuously branches off to YES at the step 102 whenever the interrupt service routine is executed, the value of i indicating the number of steps exceeds $i_{MAX}$, and therefore, the answer of the step 124 becomes YES. A step 130 takes place to see if the flag KEY is 1 or not. At the beginning KEY=0, and thus the answer of the step 130 is NO so that a step 132 follows. In this step 132 the flag KEY is set to 1, while the step number i is reset to 0. On the other hand, when the flag KEY=1, a step 131 takes place in which both the flag KEY and the step number i are reset to 0.

The above-described operation for finding a new ignition combination point successively is shown by points S, L, H, R1, R2 . . . R6 in FIG. 8. As will be understood from the comparison between FIG. 2 and FIG. 8, the way of changing the ignition timing from the point S to the point R6 in FIG. 8 is different from that shown in FIG. 2. According to the technique of FIG. 8 the ignition combination points S, L, H, R1, R2 . . . R6 are equidistantly arranged on a straight line. This is caused by the step 116 in which $\Delta\theta_i$ to be added to $\theta_1$, $\theta_2 \ldots \theta_B$, is common to all the cylinders. In other words, ignition timing combinations are changed uniformly throughout all the cylinders from the first point S to the point R6.

When the operational flow comes to the step 115, if the flag KEY has been set to 1 in the step 132 previously, the answer of the step 115 assumes NO so that a step 118 is executed in place of the step 116. In this step 118, the ignition timings of individual cylinders $\theta_1, \theta_2 \ldots \theta_M$ are respectively set as follows:

$$\begin{aligned}\theta_1 &= \theta_1 + \Delta\theta_{11} \\ \theta_2 &= \theta_2 + \Delta\theta_{21}\end{aligned} \quad (6)$$

-continued $$\theta_M = \theta_M + \Delta\theta_{M1}$$

This means that the ignition timing control according to TABLE I is effected after passing through the point R6 of FIG. 8. In TABLE I, although the ignition timing of the first cylinder #1 is changed in its second step by $\Delta\theta$ which corresponds to $\Delta\theta_{11}$ of the above formula (6) while the ignition timing of the second cylinder #2 is maintained at the same value as in the first step (namely, $\Delta\theta_{21}=0$), the value of $\Delta\theta_{21}$ is not necessarily equal to 0.

In other words, both the first and second cylinder ignition timings may be changed to set a new ignition timing combination.

The step 118 is repeatedly executed to set a plurality of ignition timing combinations until the answer of the step 115 becomes YES. When the answer of the step 115 assumes YES, then a new ignition timing combination $\theta_{new}$ is calculated in the same manner as described above. These operations are repeatedly performed to successively renew the ignition timing combination. This process is shown in points L' (R6), H', S', R'1, R'3, R'4 and R'5. In this way the optimum ignition timing combination point or peak point "A" can be found. The renewing process from the point L' to the point R'5 is substantially the same as that shown in FIG. 2, and therefore description of the way of approaching the peak point "A" from the point L' is omitted.

In the above-described embodiment, ignition timing feedback control is effected in such a manner that engine is operated by renewing the ignition timing combination by an amount common to all the cylinders for a predetermined period of time from the time of the beginning of the feedback control, and then the engine is further operated by renewing the ignition timing combination by an amount determined respectively for individual cylinders. Namely, the method according to the present invention involves a uniform control and individual control so that ignition timing is uniformly controlled throughout all the cylinders at the beginning and then ignition timing of each cylinder as individually controlled. However, such uniform control may be continued until an average value of optimum ignition timings of all the cylinder is obtained, and then the control may be switched to the individual control. In detail, in the case of a two-cylinder engine, the engine is operated with the three ignition timing combinations shown in FIG. 2 one after another to find one combination which gives the lowest engine speed. Then the lowest engine speed point is replaced with a new point obtained by the formula (2). If the engine speed given by the new ignition timing combination point is the lowest among the three combination points, the control according to TABLE II is terminated. After terminion of the control of TABLE II, the control according to TABLE I is started so that optimum ignition timing for each cylinder can be found.

According to the present invention, since the optimum ignition timing combination or peak point "A" is found by converging the initial ingnition timing by the uniform control and individual control as shown in FIG. 8, the peak point "A" can be found with less time compared to the case of FIG. 2 in which only the individual control is effected.

The above-described embodiments are just examples of the present invention, and therefore, it will be apparent for those skilled in the art that many modifications and variations may be made without departing from the spirit of the present invention.

What is claimed is:

1. A method of controlling cylinder ignition timing in an internal combustion engine having a plurality of cylinders, comprising the steps of:
   (a) operating said engine having a plurality of cylinders with various combinations of cylinder ignition timings to find any one of the following engine output parameters, speed, engine output torque and substitutes for engine output torque obtained under each of said various ignition timing combinations;
   (b) determining which one of said various combinations of cylinder ignition timings gives the lowest of said any one of the engine output parameters;
   (c) setting a new combination of cylinder ignition timings in view of the ignition timing giving said lowest engine output parameter;
   (d) operating said engine with said new cylinder ignition timing combination to find said any one of the engine output parameters which results therefrom;
   (e) substituting said new cylinder ignition timing combination for the cylinder ignition timing combination giving said lowest engine output parameter so that said steps of (a) through (d) are executed with a new set of cylinder ignition timing combinations;
   (f) repeating said step (e) for a predetermined period of time so that cylinder ignition timings for said plurality of cylinders are uniformly changed; and
   (g) subsequent to said step (f), repeating said steps of (a) to (e) so that cylinder ignition timings for each one of said plurality of cylinders are differently changed from each other.

2. A method as claimed in claim 1, wherein the number of said various combinations of cylinder ignition timings equals the number of said plurality of cylinders plus one.

3. A method as claimed in claim 1, wherein said step of setting the new combination of cylinder ignition timning comprises the steps of: calculating an average cylinder ignition timing 0 throughout said various combinations; and calculating said new combination $\theta$ new in accordance with the following equation:

$$\theta_{new} = \bar{\theta} - \alpha(\theta_{min} - \bar{\theta})$$

wherein
$\alpha$ is a constant; and
$\theta$min is the cylinder ignition timing combination giving said lowest engine output parameter.

4. A method as claimed in claim 1, wherein said lowest engine output parameter is detected by measuring the lowest engine speed obtained with a particular cylinder ignition timing combinations among said various combinations.

5. A method as claimed in claim 1, wherein said cylinder ignition timings of said plurality of cylinders are renewed, in said repeating step (f), by a predetermined advance angle which is common to all of said plurality of cylinders.

6. A method as claimed in claim 1, wherein said cylinder ignition timings for said plurality of cylinders are renewed, in said repeating step (g), by variable advance angles which are, respectively, provided to individual cylinders.

7. Apparatus for controlling cylinder ignition timing in an internal combustion engine having a plurality of cylinders, comprising:
  (a) first means for producing ignition signals which are respectively fed to spark plugs of said plurality of cylinders, said first means being capable of producing said ignition signals having different timings from one another;
  (b) second means for detecting any one of the following engine output parameters, speed, engine output torque and substitutes for engine output torque;
  (c) third means for detecting engine operating parameters; and
  (d) fourth means responsive to said second and third means for causing said first means to produce said ignition signals, said fourth means including;
  means for determining a basic cylinder ignition timing in view of said engine operating parameters;
  means for changing said basic cylinder ignition timing so that various combinations of cylinder ignition timings are provided for operating said engine with said various cylinder ignition timing combinations;
  means for detecting one of said various combinations, which gives the lowest of said any one of the engine output parameters; and
  means for setting a new cylinder ignition timing combination in view of said combination giving the lowest engine output parameter, said fourth means being arranged such that said cylinder ignition timings for said plurality of cylinders are uniformly changed repeatedly for a given period of time, and then said cylinder ignition timings for individual ones of said plurality of cylinders are respectively changed repeatedly to find an optimum cylinder ignition timing combination.

8. Apparatus as claimed in claim 7, wherein said second means comprises a pulse generator producing a pulse train indicative of the engine speed.

9. Apparatus as claimed in claim 7, wherein said fourth means comprises a computer having a processor and a memory in which ignition timing data are stored, said computer being arranged to execute an interrupt service routine in response to an interrupt request repeatedly generated.

10. Apparatus as claimed in claim 9, wherein said computer comprises means for counting the number of said various combinations so that one of said combinations giving the lowest engine output parameter is detected when said engine is operated with a predetermined number of said various combinations.

* * * * *